United States Patent
Gallagher, Jr. et al.

[15] 3,651,723
[45] Mar. 28, 1972

[54] CORRUGATED PAPERBOARD SLITTER-SCORER

[72] Inventors: William Gallagher, Jr., Clementon, N.J.; Edwin R. Kolb; James E. Murray, both of University Heights, Ohio

[73] Assignee: Harris-Intertype Corporation, Cleveland, Ohio

[22] Filed: Dec. 4, 1969

[21] Appl. No.: 882,244

[52] U.S. Cl. ........................................83/7, 83/9, 83/12, 83/71, 83/433, 83/474, 83/499, 83/659, 93/58.2
[51] Int. Cl. ........................................B26d 9/00
[58] Field of Search ..................83/7, 9, 12, 71, 56, 433, 479, 83/504, 519, 499, 498, 428, 659, 474; 93/58.2

[56] References Cited

UNITED STATES PATENTS

| | | | |
|---|---|---|---|
| 3,257,882 | 6/1966 | Lulie et al. | 83/499 X |
| 3,508,460 | 4/1970 | Goettsch | 83/474 X |
| 3,332,326 | 7/1967 | Haas | 83/433 X |
| 2,897,893 | 8/1959 | Rockstrom et al. | 83/504 X |
| 3,176,566 | 4/1965 | Patterson, Jr. | 83/433 X |
| 3,408,886 | 11/1968 | David | 83/479 X |
| 3,470,776 | 10/1969 | Brichard et al. | 83/433 X |
| 3,540,340 | 11/1970 | Koskela | 83/499 |

Primary Examiner—Frank T. Yost
Attorney—Seidel, Gonda & Goldhammer

[57] ABSTRACT

A corrugated paperboard slitter-scorer has scorer collars and slitting blades which are automatically moved in a transverse direction to a pre-programmed position for a production run. Each blade is supported by a head which is driven by a reversible stepper motor. Each stepper motor moves its head and the blade or collar associated therewith in the desired transverse direction to a preselected position. The motors are controlled by programmed signals which drive the heads to the desired positions prior to each production run. Each of the scorer collars cooperates with an elongated roller and each of the slitter blades cooperates with an elongated brush roller. The rollers are longer than the distance between the blades.

16 Claims, 9 Drawing Figures

INVENTORS.
WILLIAM GALLAGHER
EDWIN R. KOLB
BY JAMES E. MURRAY

Seidel, Gonda & Goldhammer
ATTORNEYS.

INVENTORS.
WILLIAM GALLAGHER
EDWIN R. KOLB
BY JAMES E. MURRAY

Seidel, Gonda & Goldhammer
ATTORNEYS.

CORRUGATED PAPERBOARD SLITTER-SCORER

In a machine for manufacturing corrugated paperboard comprising a single facer, glue machine, and double facer wide widths of corrugated board are scored and/or slit into strips by means of a duplex or triplex unit before the board is conveyed to the cutoff. A duplex unit has two pairs of slitting or scoring shafts located 180° apart. This permits a workman to preset the blades on the inoperative shafts for the next production run. A triplex unit has three pairs of slitting or scoring shafts located 120° apart. This permits a workman to preset the blades on the inoperative shafts for the next two production runs. The disadvantages in the design of such units are that they require excessive setup time and extreme precision in adjusting the blades. Setting the heads in the limited space provided is also hazardous.

The present invention eliminates the need for a workman to manually position the blades; it eliminates the need for access space; and it permits the setup for the next production run to be accomplished faster and more accurately and at no hazard to the workman. Compared to a setup time of 10 minutes or more on a duplex or triplex unit, the present invention accomplishes setup for a production in less than 15 seconds. This rapid setup time permits short runs on an economical basis since the long setup time has been eliminated. Each of the slitting blades and scorer collars on a single shaft cooperates with a single elongated roller. This structural interrelationship eliminates the need for relocating matching pairs of blades as was conventional heretofore. The term "scorer collars" is used herein to avoid confusion with the slitting blades even though the scorer collar can be considered as supporting a scorer blade.

The heads which support the blades and collars are slidable along a keyed shaft and guided by a track. A rack parallel to the track is in meshing engagement with a pinion on each head. Each head includes a reversible stepper motor to drive the pinion. Energization of a motor causes its associated head to move transversely along the shaft. The motors may be controlled by an online stored program having a multiplex output storage buffer. The buffer has a memory enabling it to remember the present position of each head.

The program may be stored in any conventional manner such as punched tape or punched cards or magnetic cards or magnetic tape. Apparatus such as a computer compares the present position of each blade with the desired position and generates an error signal which effects simultaneous operation of the stepper motors in a first direction. The motors are stopped in cascading fashion until there are no further error signals. Then the computer effects simultaneous operation of the motors for the heads in an opposite transverse direction. These motors are also stopped in cascading fashion until there are no error signals.

It is an object of the present invention to provide a machine having a rotatable blade which may be automatically moved transversely along a shaft to a desired position for a production run.

It is another object of the present invention to provide a slitter for use in processing corrugated paperboard wherein the slitting blades may be automatically moved transversely along a shaft to a desired position for a production run.

It is another object of the present invention to provide a scorer for use in processing corrugated paperboard which includes scorer collars which may be automatically moved transversely along a shaft to a desired position for a production run.

It is another object of the present invention to provide a slitter-scorer having blades which may be automatically and selectively positioned for a production run in a manner which is substantially faster than heretofore possible.

It is another object of the present invention to provide a slitter-scorer having blades which may be preset for a subsequent run within a sufficiently short period of time so that short runs of a few minutes may be processed.

It is another object of the present invention to provide a slitter-scorer having blades which may be adjusted for a production run in an accurate and more efficient manner without the requirement of manual labor.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
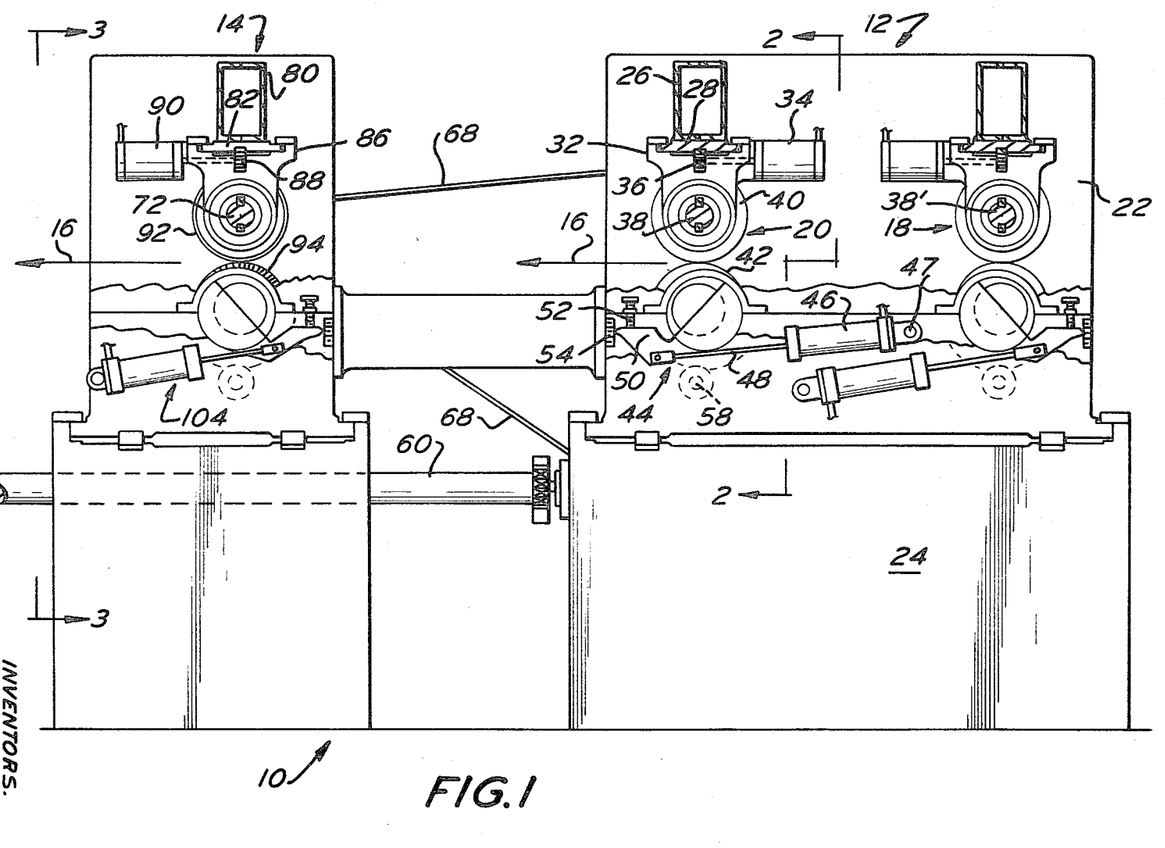
FIG. 1 is a longitudinal elevation view of a slitter-scorer in accordance with the present invention.

Referring to the drawing in detail, wherein like numerals indicate like elements, there is shown in FIG. 1 a slitter-scorer in accordance with the present invention designated generally as 10. The slitter-scorer 10 includes a scorer 12 and a slitter 14 through which corrugated paperboard will be processed in the direction and in the plane of the arrows 16.

The scorer 12 includes two or more scorer units such as scorer units 18 and 20. The scorer units 18 and 20 are identical. Hence, only scorer unit 20 will be described in detail.

The scorer unit 20 is supported between side plates 22 (only one shown) on a base 24. A beam 26 extends between the side plates 22 and supports a track 28 on its lower surface. As shown more clearly in FIG. 2, the track 28 is provided with a rack 30 on its lower surface.

Figures 2, 3:
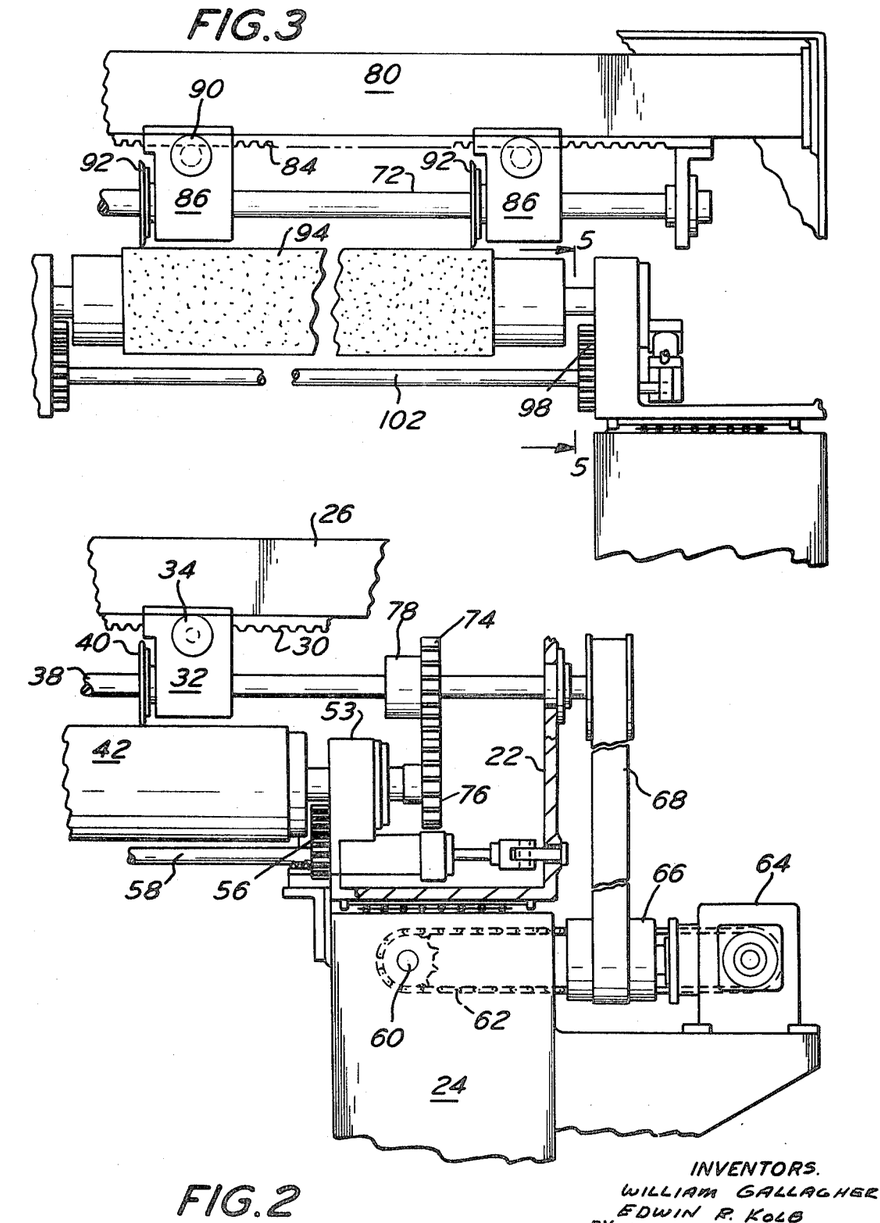
FIG. 2 is a sectional view taken along the line 2—2 in FIG. 1.
FIG. 3 is an end view taken along the line 3—3 in FIG. 1.

A plurality of scorer heads 32 are slidable along the track 28. Each head 32 includes a pinion 36 in meshing engagement with the rack 30. Each pinion 36 is driven by a stepper motor 34 supported on the head 32.

Any one of a wide variety of commercially available stepper motors may be utilized for motor 34. One suitable example of a stepper motor 34 is a HS 50L stepper motor manufactured by Superior Electric. The motor 34 is reversible so that it may cause the head 32 to move in a transverse direction along the length of the track 28 to any position by energizing it with a predetermined number of pulses. Each pulse causes the motor to translate the head a fixed distance. By way of example, 500 pulses applied to the motor 34 may cause the head 32 to move one-half inch along the length of the track 28. In this manner, positioning of the head 32 for a production run, and the blade supported thereby, may be accurately accomplished in a rapid manner.

The head 32 is supported by and is slidable along a shaft 38. Shaft 38 extends between the side frames 22 and is adapted to be rotatably driven about its longitudinal axis. A scorer collar 40 is supported by the head 32 and is keyed to the shaft 38 so as to be rotatably driven thereby.

Each of the collars 40 driven by shaft 38 is juxtaposed to the periphery of an anvil roller 42 therebelow. The length of anvil roller 42 is greater than the distance between the furthermost collars 40 driven by shaft 38. Anvil roller 42 is preferably provided with an outer peripheral coating from a polymeric plastic material such as polyurethane. Since the single roller 42 cooperates with every collar driven by shaft 38, the roller 42 need not be shifted transversely when setting up the collars for a particular production run. Thus, it will be noted that the present invention involves the elimination of the conventional mating pairs of collars and anvils which heretofore had to be adjusted simultaneously.

Before the collars 40 are shifted transversely to a new position for a production run, the collars must be moved upwardly away from the roller 42 or, alternatively, the roller 42 must be moved downwardly away from the collars 40 for a short distance such as one-fourth inch. This assures that movement of the collars transversely will not scratch or otherwise mar the surface of roller 42.

For purposes of illustration, there is disclosed an actuating means 44 for selectively moving the roller 42 toward and away from the periphery of the collars 40. Actuating means 44 includes a cylinder 46 rotatable about the axis of pin 47. The piston rod 48 extending from cylinder 46 is connected to a segment 50 having a sharp point juxtaposed to a scale 54. An adjustable limit stop 52 may be provided to assure repetitive positioning of segment 50. Segment 50 is rotatable about an axis parallel to but spaced from the longitudinal axis of roller 42 and forms a part of a conventional eccentric adjusting means 53.

A gear segment 56 is attached to each end of the shaft for roller 42. Each gear segment 56 is in meshing engagement with a gear on shaft 58 below the roller 42. In this manner, the adjustment of the roller 42 with respect to the periphery of the blades will be uniform at each end of the roller 42. If desired, brake means (not shown) may be provided for shaft 38 to prevent rotation when means 44 is actuated. This may be necessary to assure reengagement of the gears when the roller 42 is again moved back into its operative position.

Figure 4:
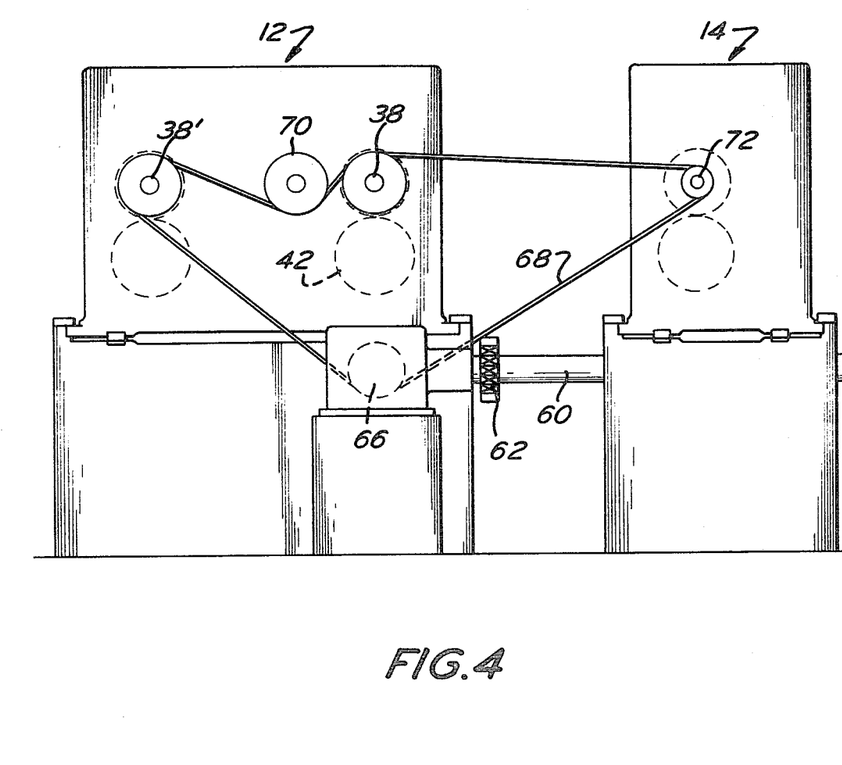
FIG. 4 is a rear elevation view of the slitter-scorer shown in FIG. 1.
Figure 5:
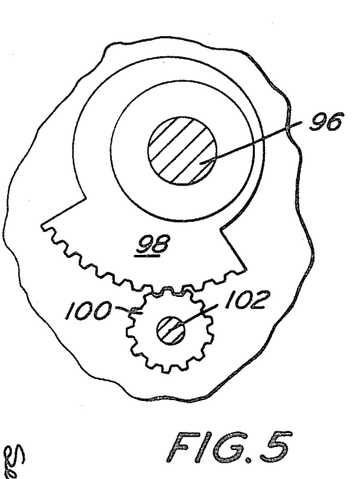
FIG. 5 is a sectional view taken along the line 5—5 in FIG. 3.

The slitter-scorer 10 is driven in synchronism with the corrugated paperboard processing equipment including a doublefacer and cutoff machine by means of an in-line shaft 60. Shaft 60 is rotatably coupled to the input of a gear box 64 by means of a chain 62. See FIG. 2. The output shaft from gear box 64 is provided with a pulley 66. A belt 68 extends around pulley 66, around a pulley on shaft 38', around a pulley on shaft 38, and around a pulley on shaft 72. An idler pulley 70 may be provided on the scorer 12 as illustrated in FIG. 4. Shaft 72 forms a part of the slitter 14 and will be described in greater detail hereinafter. A gear 74 on the scorer drive shaft 38 is meshed with a gear 76 on the shaft for roller 42. An over-riding clutch 78 between gear 74 and shaft 38 permits the friction between the corrugated paperboard and the roller 42 to drive the roller 42 at board speed.

Referring to FIGS. 1 and 3, it will be seen that the slitter 14 is similar to the scorer 12. A beam 80 extends between the side frames of the slitter 14. A track 82 is supported by the lower surface of the beam 80. Track 82 is provided with a rack 84 on its lowermost surface. A plurality of slitter heads 86 are provided on the drive shaft 72 and movable along the track 82. Each head 86 includes a pinion 88 in meshing engagement with the rack 84. Each head 86 includes a stepper motor 90 comparable to stepper motor 34.

Each of heads 86 includes a slitting blade 92 which is driven by shaft 72 and coupled thereto by way of a key. Operation of the motor 90 rotates the pinion and causes the head 86 to move along the track 82 while the shaft 72 rotatably drives each of the blades 92 about the axis of shaft 72.

An elongated roller 94 is juxtaposed to the periphery of each of the blades 92. Roller 94 is longer than the distance between the furthermost blades 92 on shaft 72. Roller 94 is preferably a brush roller of the type disclosed in U.S. Pat. application Ser. No. 706,179 and now U.S. Pat. No. 3,508,460, the disclosure of which is incorporated herein by reference.

The roller 94 is provided with an actuating means 104. Means 104 is the same as means 44 and performs the function of moving the roller 94 toward and away from the periphery of the blades 92. In order that both ends of the roller 94 may move the same amount at the same time, a segment gear 98 is secured to each end of the shaft 96 for roller 94. Each segment gear 98 is in meshing engagement with a gear 100 on the opposite ends of shaft 102. If desired, brake means (not shown) may be provided for shaft 72 to prevent rotation when means 104 is actuated. This may be necessary to assure reengagement of the gears when the roller 94 is again moved back to its operative position.

Control and actuation of all the stepper motors for the blades driven by shafts 38, 38' and 72 is accomplished by electronic means including a computer 106 coupled by appropriate circuitry to the stepper motors. The computer is programmed to generate control signals to step the scorer heads and slitter heads to preselected positions for a production run. Substantially all general purpose computers may be programmed and used in practicing the present invention. However, a computer is not necessary; a device which is capable of being programmed to generate a requisite set of pulses would be sufficient.

Figure 6:
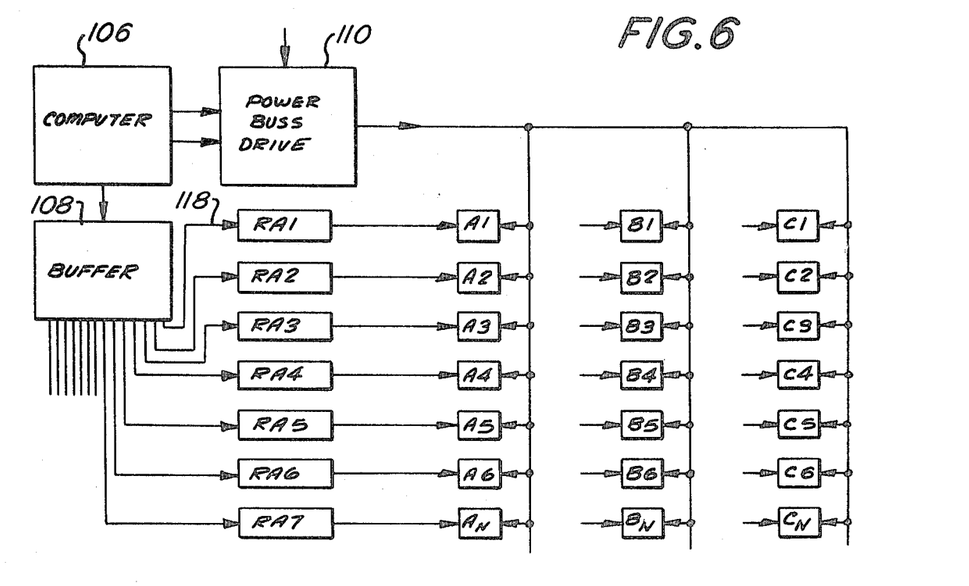
FIG. 6 is a block diagram of the computer and circuitry coupled to the motors for the blades.

Referring to FIG. 6, there is provided a diagrammatic illustration of control circuitry including an online stored program computer 106 coupled to a multiplex output, storage buffer 108. Computer 106 is also coupled to a power bus drive 110 which in turn is electrically coupled to the stepper motors associated with shafts 38, 38' and 72.

In FIG. 6, the drive mechanism including the stepper motors supported by heads on shaft 72 are designated by the numerals A1, A2, ... AN. The motors associated with shaft 38 are designated B1, B2 ... BN. The motors associated with shaft 38' are designated C1, C2 ... CN. A greater or lesser number of heads than shown may be utilized as desired. Each motor A is coupled to the multiplex output storage buffer 108 through a relay drive. Thus, motor A1 is coupled through a relay drive RA1 to the multiplex output storage buffer 108. Each relay drive controls the switching of its associated motor into and out of connection with the power bus drive 110. The motors B and C are similarly coupled to the buffer 108.

It should be apparent from the foregoing that FIG. 6 is illustrative of a circuit which includes a series of motors A1, A2 . . . AN; B1, B2 . . . BN; and C1, C2 . . . CN whose operation is controlled by a series of switches (relays) which in turn are controlled by a computer. The switches control the application of power from a common drive circuit 110 to the motors. Thus, the motors can be used to drive their associated scorer and slitter heads to the correct position on a track. Stepper motors are used because they react to a pulse and pulses can be counted to provide a direct indication of the physical position of a slitter or scorer head at any particular instance.

Figure 7:
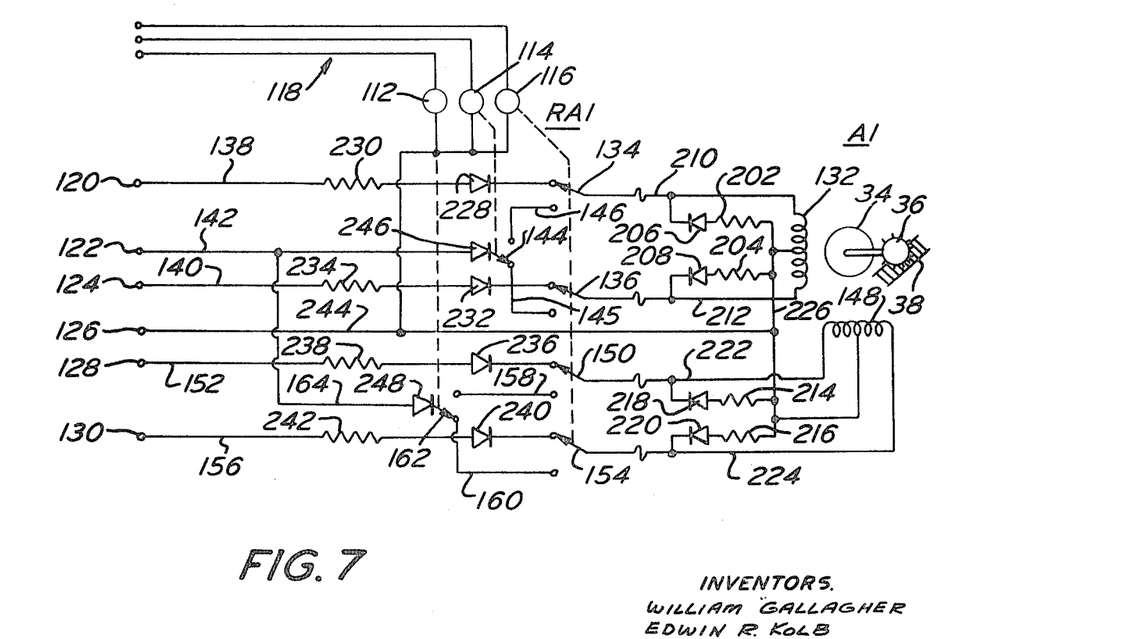
FIG. 7 is a diagrammatic illustration of circuitry forming a part of the system shown in FIG. 6.

FIG. 7 is a schematic illustration of a particular slitter or scorer head which includes by way of example the drive mechanism A1 and the drive relay RA1 all mounted within a scorer head.

As shown, the stepper motor 34 is provided with conventional coils 132 and 148 which are each connected through the relay drive RA1 to an appropriate power supply which generates the requisite pulses. Coil 132 is center tapped and connected through resistors 202 and 204. Resistors 202 and 204 are in turn connected in series to diodes 206 and 208 which are connected to conductors 210 and 212.

In a like manner, coil 148 is center tapped and connected to resistors 214 and 216 which in turn are connected in series to diodes 218 and 220. Diodes 218 and 220 are connected in series to conductors 222 and 224 respectively. The center tap on coil 132 is connected by conductor 226 to the center tap on coil 148.

The foregoing described series connected resistors and diodes serve as reactive energy paths or shunts to limit or remove the effect of transient switching voltages.

Drive relay RA1 includes three individual relays, namely relay 112, relay 114 and relay 116. Relay 116, as illustrated, controls relay switches 134, 136, 150 and 154. Relay 114, as illustrated, controls relay switch 144. Relay 112, as illustrated, controls relay switch 162. Relay 116 is shown in the energized condition; that is, its associated switches 134, 136, 150 and 154 are connected on line with the power buss drive. Thus, as shown, switch 134 connects one terminal of coil 132 through conductor 210, diode 228, resistor 230, and conductor 138 to terminal 120. In a like manner, relay switch 136 connects the opposite terminal of coil 132 through conductor 212 to diode 232, resistor 234, and conductor 140 to terminal 124. Relays 112 and 114 are also shown in their energized condition.

Relay switch 150 connects one terminal of coil 148 through conductor 222 to diode 236, resistor 238, and conductor 152 to terminal 128. In a like manner, the opposite terminal of coil 148 is connected by relay switch 154 through conductor 224 to diode 240, resistor 242, and conductor 156 to terminal 130.

Conductor 226 which is connected to the center tap of each of the motor coils 132 and 148 is connected by conductor 244 to terminal 126 which in turn is connected to ground potential. Thus, each of the center taps on the motor coils 132 and 148 is grounded.

Each of the resistors 230, 234, 238 and 242 is connected in series with the stepper motor coil windings to decrease the time constant thereof. The speed of the stepper motor is increased by reducing the L/R time constant. The choice of an appropriate value for the resistance in series with the coils provides the requisite number of steps per second. In one example, the motor 34 may be driven at 400 steps per second.

To complete the description of the circuit illustrated in FIG. 7, terminal 122 is connected through conductor 142 to diode 246 which in turn is connected to relay switch 144. Conductor 164 is connected from conductor 142 to diode 248 which is connected in series with relay switch 162. Relay switch 144 is controlled by relay 114 which in turn determines whether terminal 122 is connected through diode 246 to either terminal 145 as shown or to terminal 146. Relay switch 162 is controlled by relay 112 which determines whether terminal 122 is connected through conductor 164 to either terminal 160 as shown or to terminal 158.

Each of the diodes 228, 246, 232, 236, 248 and 240 insures decoupling as each relay is switched on and off in the appropriate sequence. This is conventional and the diodes are appropriately rated to accomplish this function.

Figure 8:
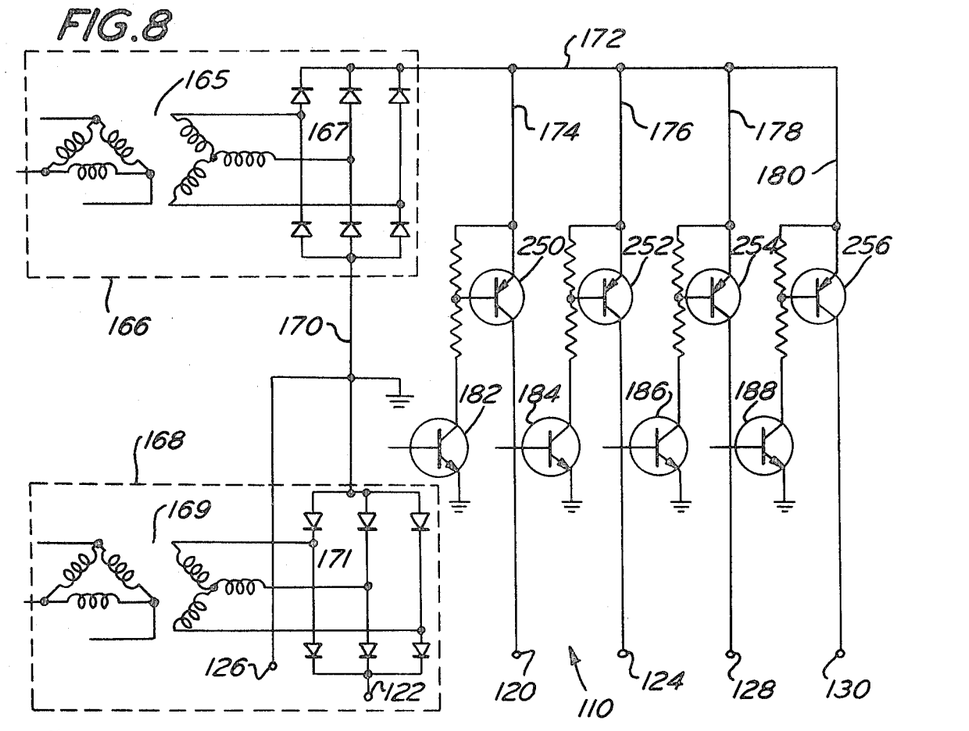
FIG. 8 is a diagrammatic illustration of circuitry forming a part of the system shown in FIG. 6.

FIG. 8 is a schematic illustration of the high power buss drive 110 for the several stepper motors. As such, its function is to generate a series of pulses which may be applied to the motors.

As shown, the bus drive 110 includes a Delta-Wye three phase transformer connected to a three phase rectifying section 167. The transformer 165 and rectifying section 167 may be referred to as the high power rectifier section 166.

In a like manner, a low power rectifier section 168 may include a three phase Delta-Wye transformer 169 and a three phase rectifier section 171 connected as shown. By way of example, the output of the high power rectifier section 166 may be 10 kilowatts at approximately 50 volts at 150 amps. The low power rectifier section 168 may be, by way of example, 1 kilowatt at 5.5 volts at 150 amps. The two rectifier sections 167 and 171 are connected to a common ground which in turn is connected to ground terminal 126. Terminal 126 in FIG. 8 is the same as terminal 126 in FIG. 7. The positive terminal of rectifier 171 is connected to terminal 122 which is the same as terminal 122 in FIG. 7. Thus, relays 112 and 114 control the switching of the output of low power rectifier section 168 to the respective relay switches 162 and 144.

The direct current output of the high power rectifier section 166 is connected through conductor 172 to conductors 174, 176, 178 and 180 which in turn are connected to the emitter-base circuits of power transistors 250, 252, 254 and 256, respectively. As shown, the collector of power transistor 250 is connected to terminal 120; the collector of power transistor 252 is connected to terminal 124; the collector of power transistor 254 is connected to terminal 128; and the collector of power transistor 256 is connected to the terminal 130. Terminals 120, 124, 128 and 130 in FIG. 8 are the same as terminals 120, 124, 128 and 130 in FIG. 7. Transistors 250, 252, 254 and 256 act as switches to control the application of pulses of direct current to each of their respective terminals 120, 124, 128 and 130. Since each of these terminals is connected through switches 134, 136, 150 and 154 to one of the terminals of stepper motor coils 132 and 148, the appropriate drive for the motor is thereby provided.

Each of the power transistors 250, 252, 254, and 256 is, of course, controlled by applying an appropriate voltage bias to its base circuit. This control may be accomplished by any conventional means. In the embodiment shown, transistors 182, 184, 186 and 188 are shown connected in the base circuit of each of the power transistors 250, 252, 254 and 256. Transistors 182, 184, 186 and 188 in turn are connected to appropriate electronic circuitry (not shown) to the computer 106 which is programmed to generate the appropriate control signals. The electronic circuitry may be any conventional coupling circuitry.

Figure 9:
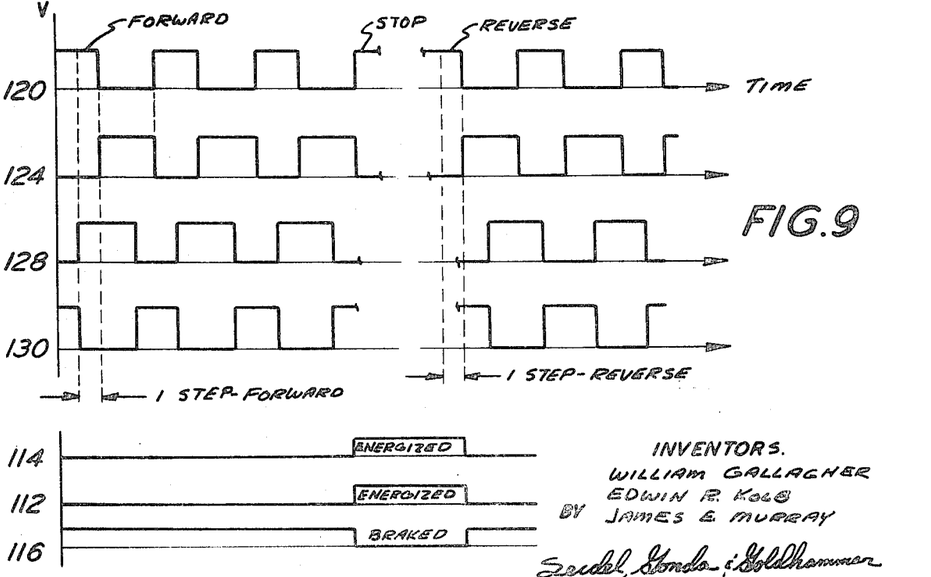
FIG. 9 is a diagrammatic timing graph.

FIG. 9 is a schematic diagram illustrating the time profile of the output of a typical set of signals generated by appropriately biasing the power transistors 250, 252, 254 and 256. FIG. 9 also shows the timing profiles of a typical set of signals that could be sent to the relays 112, 114 and 116.

As indicated previously, terminals 120 and 124 are connected to coil 132. Accordingly, the signal voltages V developed at these terminals are 180° out of phase. In a like manner, the terminals 128 and 130 are connected to the coil 148. Accordingly, the signals developed at those terminals are 180° out of phase. Moreover, there is a phase differential between the signals developed at terminals 120 and 124 on the one hand and the signals developed at the terminals 128 and 130 on the other hand. This latter phase difference is 90°. As thus arranged, the appropriate direct current stepping sequence for causing the motor to step in a clockwise direction is provided. Thus, the signal on the coils 132, 148 follow the following switching sequence: positive-positive; negative-positive; negative-negative; positive-negative; and positive-positive. To reverse the direction, the switching sequence is reversed. The first step is illustrated in FIG. 9 by noting that the application of voltage to coils 132 and 148 is positive-positive. The remaining sequence can be observed by simply blocking off 90° sections along the time scale.

It should be noted that the frequency of the pulses vary. This is so that the stepping rate of a bus driver 110 can be modulated so as to provide for start-up and slowdown but not to cause any stepper motor to lose synchronism. In other words, each stepper motor starts slowly and stops slowly.

The foregoing describes how each stepper motor can be driven from a common power bus drive generating the appropriate stepping signals. As each motor is driven from a common bus, it necessarily follows that all the motors must be driven in the same direction simultaneously. FIG. 9 illustrates the sequence for driving the motors in a forward direction. It also illustrates a stop section and then a sequence of pulses for driving the motors in a reverse direction. In the stop phase, the last applicable state was a positive-positive voltage. To continue the operation of the motor in the same direction, a negative-positive voltage must be applied. To reverse the direction of the motor, a positive-negative voltage must be applied. Such a reverse first pulse is illustrated between the dotted lines.

As indicated above, the application of control signals derived from computer 106 causes the power bus drive to generate voltage signals illustrated in FIG. 9. These signals simultaneously cause the rotation of each stepper motor in the same direction. However, each slitter and scorer head is not to be moved the same amount. Accordingly, each slitter or scorer head must be removed from the common bus when it reaches its preselected position. This is accomplished by properly operating the relay drive associated with each slitter and scorer head. The operation of the relay drive is in turn controlled by the computer 106 and the storage buffer 108. Since each stepper motor is identical, each pulse generated by the power bus drive 110 represents the movement or translation of a slitter or scorer head by a single step and each step represents the same distance. Accordingly, the computer 106 knows the precise position of each slitter or scorer head simply by counting the number of pulses generated.

In accordance with the present invention, computer 106 counts the number of pulses and compares the pulses in a conventional manner with a desired count for each slitter and scorer head. When the counts match, signals are sent to the relay drives to operate the relay 116 to remove the motor from the common bus and operate relays 114 and 112 in such a way that, either by sending current to these relay coils or by not sending current, the polarity of the last pulse set applied to the motor is remembered. Stated otherwise, relays 112 and 114 assume a state which is determined by the polarity of terminals 124 and 130 just before the slitter or scorer head is stopped. This is done to brake the motor in the last position it has assumed due to being pulsed by the power bus drive.

Referring now to FIG. 7, it should be apparent that relay 116 determines whether or not the motor coils 132 and 148 are connected to the main bus drive or to the braking drive. Relay switches 134, 136, 150 and 154 are shown in the energized position. To stop or brake the motor, relay 116 is deenergized thereby moving switches 134, 136, 150 and 154 into contact with terminals 146, 145, 158 and 160, respectively. At the moment relay 116 is deenergized to stop the stepper motor 34, one of the two terminals of coil 132 will be positive with respect to the other and, similarly, one of the two terminals of coil 148 will be positive with respect to the other. As previously described, transformer-rectifier section 168 provides a positive voltage which may, for example, be 5.5 volts at approximately 150 amps to the terminal 122 in FIG. 8. Terminal 122 in FIG. 8 is the same as terminal 122 in FIG. 7. Accordingly, a positive voltage is always available at switches 144 and 162. Thus, the condition of relays 112 and 114 determines which of terminals 145 and 146 and which of terminals 158 and 160 are to be positive.

As indicated above, the states of relays 112 and 114 are determined by the previous states of terminals 122 and 130 just as the motor is stopped. In FIG. 9, terminals 124 and 130 were positive when the motor was stopped. Accordingly, relays 112 and 114 are energized thereby moving the switches 144 and 162 into the position shown. The condition of relays 112 and 114 is determined by computer 106 which senses the last state of terminals 124 and 130 and sends a signal via conductors 118 to the relays. Relays 112 and 114 are shown in their energized condition as indicated in FIG. 9. Of course, any one of the four possible combinations for relays 112 and 114 could be assumed, depending upon the last condition of terminals 124 and 130 just before the motor is stopped.

Another advantage of maintaining the current through the coils 132 and 148 by properly energizing or deenergizing relays 112 and 114 is that neither motor jumps to its next state. In other words, the current maintained in the coils acts as a brake. Moreover, each motor is in the proper state when it is again desired to move the head with which it is associated. For example, after the completion of the run, it may be desired to move the head to a new position. Each of the motors may be in one of four states depending upon when it was removed from the common bus. Relays 112 and 114 maintain the appropriate conditions so that the memory can also determine the exact position of each motor, depending upon the number of steps counted.

During each operation, the computer senses the head with the largest error and counts until there is a zero error or a match between counts. As it counts, it also senses the error in the remaining steps and drops each head off the common bus when there is a match.

The computer operates to control the simultaneous movement of all heads which are to move in a first direction and to drop them off the common bus as they reach their correct positions. Thereafter, the computer operates to initiate the drive of all heads which must be moved in the opposite direction. Once this is completed, the slitter-scorer is in condition for operation. The setup process which previously took 10 minutes or more has now been completed in approximately 15 seconds. Stated otherwise, each of the heads is dropped off the common bus in cascading fashion as it arrives at its proper position.

The present invention has been described for use with a general purpose computer 106. The computer is programmed to not only control the movement of each head but also to remember the last position of each head so as to determine the requisite pulses for driving it to the next position. The computer 106 can, however, be replaced by a much less complex device whose only function is to generate control pulses. Such a device could be, for example, a punched tape reader which generates control pulses as described above. The tape would contain a program directing the heads from a park position to an operating position. The tape would be programmed to direct each head from the existing operating position back to the park position at the end of each run. Thereafter a new tape having a new program could be inserted in the reader and the heads moved to their new position.

The present invention may be embodied in other specific forms without departing from the spirit or essential attributes thereof and, accordingly, reference should be made to the appended claims, rather than to the foregoing specification as indicating the scope of the invention.

We claim:

1. A machine for processing paperboard including means supporting a plurality of heads, said heads being movable along said support means, each head including a rotatable blade for contacting paperboard being processed, each head having a discrete reversible stepper motor movable therewith along a support means, a track parallel to said support means, each head being guided by said track, each motor being coupled to said track for effecting movement of its respective head along the support means, an elongated roller juxtaposed to the periphery of said blades and having its axis substantially parallel to said track, said roller having a length greater than the distance between the blades so that the roller does not have to be moved axially when the heads are moved, and programmed electronic control means coupled to each motor for causing each motor to move its head to a preselected position along the support means for a production run.

2. A machine in accordance with claim 1 wherein said roller is a brush roller, and said blades are slitting blades.

3. A machine in accordance with claim 1 wherein said blades are slitter blades, each blade being driven by a common shaft.

4. A machine in accordance with claim 1 wherein each blade is a scorer collar driven by a common shaft.

5. A machine in accordance with claim 1 wherein said blades are scorer collars, said paperboard processing means including a second support means downstream from said support means, said second support means having heads movable therealong with each head including a slitting blade for slitting scored paperboard, a drive means for causing movement of the heads along the second support means, and said control means being coupled to each of the motors.

6. A machine in accordance with claim 1 wherein said blades are slitter blades, said roller being a brush roller having an interference fit with said blades, second support means parallel to said first-mentioned support means, said second support means supporting a plurality of scorer heads, said scorer heads being movable along said second support means, each scorer head including a rotatable scorer blade for scoring paperboard before it is slit by the slitter blades, each scorer head having a discrete reversible stepper motor movable therewith along the second support means, a second track parallel to said second support means, each scorer head being guided by said second track, each scorer head motor being coupled to said second track for effecting movement of its respective head along the second support means, an elongated anvil roller juxtaposed to the periphery of said scorer blades, said anvil roller having a length greater than the distance between the scorer blades so that the anvil roller does not have to be moved axially when the scorer heads are moved, and said programmed electronic control means coupled to each scorer head motor for causing each scorer head motor to move its head to a preselected position along the second support means for a production run.

7. In a machine for processing paperboard comprising a plurality of heads, each head including a member for contacting paperboard being processed, support means for said plurality of heads, said heads being mounted on said support means for reciprocable translation therealong, a discrete drive motor means reciprocatively associated with each head for moving each head from a current position to a new position, and a programmed control means for controlling each drive motor means to simultaneously move each head to be moved in a first direction from its current position to a new position and stopped in cascading fashion and for subsequently simultaneously moving each head to be moved in an opposite direction from its current position to a new position and stopped in a cascading fashion.

8. In a machine for processing paperboard in accordance with claim 7 wherein said programmed control means includes a memory storage device for storing a program and comparing the current position of each head with the preselected position, said programmed control means generating a signal to cause said drive means to reduce any error between the current and the preselected position to zero.

9. In a machine for processing paperboard in accordance with claim 7 wherein said drive means includes a stepper motor, said drive means also including memory means to remember the last state of said stepper motor prior to its deenergization.

10. In a machine for processing paperboard in accordance with claim 7 wherein said programmed control means includes a memory storage device for storing a program and generating control signals for controlling said drive means, a common power supply for each of said drive means, said power supply including a control responsive to control signals developed by said memory storage device, said power supply generating power to drive said drive means in response to said control signals in a mode whereby the response of each said drive means is known and its position is a function of said response, each drive means including switch means to disconnect it from said power supply, each switch means being connected to said memory storage device and being responsive to a signal generated thereby to disconnect said drive means from said power supply when said head reaches its new position.

11. In a machine for processing paperboard, a plurality of heads, each head including a member for contacting paperboard being processed, support means for said plurality of heads, said heads being mounted on said support means for reciprocable translation therealong, a discrete drive means supported by each head for moving each head from a park position to a new position, and programmed electronic means including a common bus for sequentially controlling each drive means to move each head to be moved in a first direction from its park position and to drop the heads off and brake the heads in cascading fashion from the common bus as they reach a new position.

12. In a machine in accordance with claim 11, wherein each head rotatably supports a slitter blade, a brush roller juxtaposed to the periphery of said blades, the length of said roller being greater than the distance between the blades so that the roller need not be shifted axially as the heads are moved.

13. In a method of processing paperboard comprising the steps of engaging paperboard with a plurality of rotating blades supported on a shaft while rotating a roller juxtaposed to the periphery of the blades, shifting the blades and an associated drive means along the shaft after a production run to a new preselected position opposite the roller without shifting the roller in an axial direction, said shifting step including using a computer programmed with information indicative of the present position of the blades and the new preselected position for the blades during the next production run, and causing said computer to control a discrete drive means associated with each blade to effect said shifting in a manner so that each of the blades to be shifted in one direction is shifted simultaneously and then stopped in a cascading fashion.

14. A method in accordance with claim 13 including the step of moving one of the rollers or the blades so as to have a definite gap between the periphery of the roller and the periphery of the blades before shifting the blades.

15. A method in accordance with claim 13 including directing a signal from a cutoff device to said computer to initiate said shifting step.

16. A method in accordance with claim 13 including braking the motors and maintaining the motors in a proper state for movement to a new position by maintaining current in center tapped coils on said motors.

* * * * *

UNITED STATES PATENT OFFICE
CERTIFICATE OF CORRECTION

Patent No. 3,651,723      Dated March 28, 1972

Inventor(s) William Gallagher, Jr. et al

It is certified that error appears in the above-identified patent and that said Letters Patent are hereby corrected as shown below:

Claim 1, line 6, change "along a" to -along said-.
Claim 1, line 9, change "along the" to -along said-.
Claim 3, line 2, change "slitter" to -slitting-.
Claim 5, line 2, cancel "said".
Claim 5, line 3, after "said" insert -first mentioned-.
Claim 5, line 6, change "drive means" to -discrete motor-.
Claim 6, line 19, after "means" insert -being-.
Claim 8, line 6, after "drive" insert -motor-.
Claim 9, lines 2 and 3, after "drive" insert -motor-.
Claim 10, lines 4, 5, 8, 9, 11, and 14, after each occurrence of "drive" insert -motor-.
Claim 10, line 14, change the first occurrence of "said" to -each-.
Claim 10, last line, change "said" to -its-.

Signed and sealed this 12th day of November 1974.

(SEAL)
Attest:

McCOY M. GIBSON JR.
Attesting Officer

G. MARSHALL DANN
Commissioner of Patents